(12) United States Patent
Anderson et al.

(10) Patent No.: US 6,302,575 B1
(45) Date of Patent: Oct. 16, 2001

(54) JIG SUITABLE FOR MOUNTING IN A PAINT SHAKER

(75) Inventors: Theodore P. Anderson, Uxbridge, MA (US); Lawrence H. Boise, Derry, NH (US); Richard C. Herring, Wellesley; Robert G. Modrak, Franklin, both of MA (US)

(73) Assignee: Gloucester Co., Inc., Franklin, MA (US)

(*) Notice: Subject to any disclaimer, the term of this patent is extended or adjusted under 35 U.S.C. 154(b) by 0 days.

(21) Appl. No.: 09/557,298

(22) Filed: Apr. 25, 2000

Related U.S. Application Data

(62) Division of application No. 09/452,881, filed on Dec. 2, 1999.
(60) Provisional application No. 60/111,156, filed on Dec. 7, 1998.

(51) Int. Cl.[7] ............................. B01F 11/00; B01F 15/00
(52) U.S. Cl. ......................................... 366/349; 366/209
(58) Field of Search ........................... 366/110–112, 114, 366/130, 189, 208–214, 216, 217, 348, 349, DIG. 605; 211/74; 248/311.2, 108, 109

(56) References Cited

U.S. PATENT DOCUMENTS

| | | | |
|---|---|---|---|
| Re. 30,276 | * 5/1980 | Rohde | 211/74 |
| 692,059 | * 1/1902 | Morse . | |
| 2,060,932 | * 11/1936 | Friermood . | |
| 3,265,366 | * 8/1966 | Warner . | |
| 4,005,033 | 1/1977 | Gorgeau, et al. . | |
| 4,114,196 | * 9/1978 | Lostutter | 366/348 |
| 4,118,801 | * 10/1978 | Kraft et al. | 366/208 |
| 4,329,068 | * 5/1982 | Neuner et al. | 366/214 |
| 4,571,415 | 2/1986 | Jordan, Jr. . | |
| 4,626,567 | 12/1986 | Chang . | |
| 4,676,655 | * 6/1987 | Handler . | |
| 4,747,693 | * 5/1988 | Kahl | 366/208 |
| 5,044,758 | * 9/1991 | Kurtz | 366/605 |
| 5,055,511 | 10/1991 | Ingle . | |
| 5,120,785 | 6/1992 | Walker . | |
| 5,124,384 | 6/1992 | Goldstein . | |
| 5,216,057 | 6/1993 | Pratt, et al. . | |
| 5,227,433 | 7/1993 | Frankel . | |
| 5,518,774 | 5/1996 | Kappock . | |
| 5,663,224 | 9/1997 | Emmons . | |
| 5,686,523 | 11/1997 | Chen, et al. . | |
| 5,753,742 | 5/1998 | Bumanlag . | |
| 5,788,194 | * 8/1998 | Van Den Berg | 248/109 |
| 6,040,380 | 3/2000 | Dunaway et al. . | |
| 6,102,215 | * 8/2000 | Guida | 248/311.2 |

* cited by examiner

Primary Examiner—Charles E. Cooley
(74) Attorney, Agent, or Firm—Pepper Hamilton LLP; Gilberto M. Villacorta

(57) ABSTRACT

A jig is described that is suitable for mounting in a paint shaker. The jig includes a first (top) section and a second (bottom) section. Each of the top section and the bottom section includes a respective substantially cylindrical frame having a respective outer surface and an inner surface. Each respective inner surface has a plurality of respective openings for holding tubular containers, such as caulking tubes. The top section and the bottom section fit together in direct, seating contact to form a substantially cylindrical jig capable of holding a plurality of caulking tubes. The bottom section also has a plurality of third openings for receiving nozzle portions of the caulking tubes. When the top section and the bottom section are fitted together, with caulking tubes contained therein, nozzles of the caulking tubes do not project out from the top section.

10 Claims, 6 Drawing Sheets

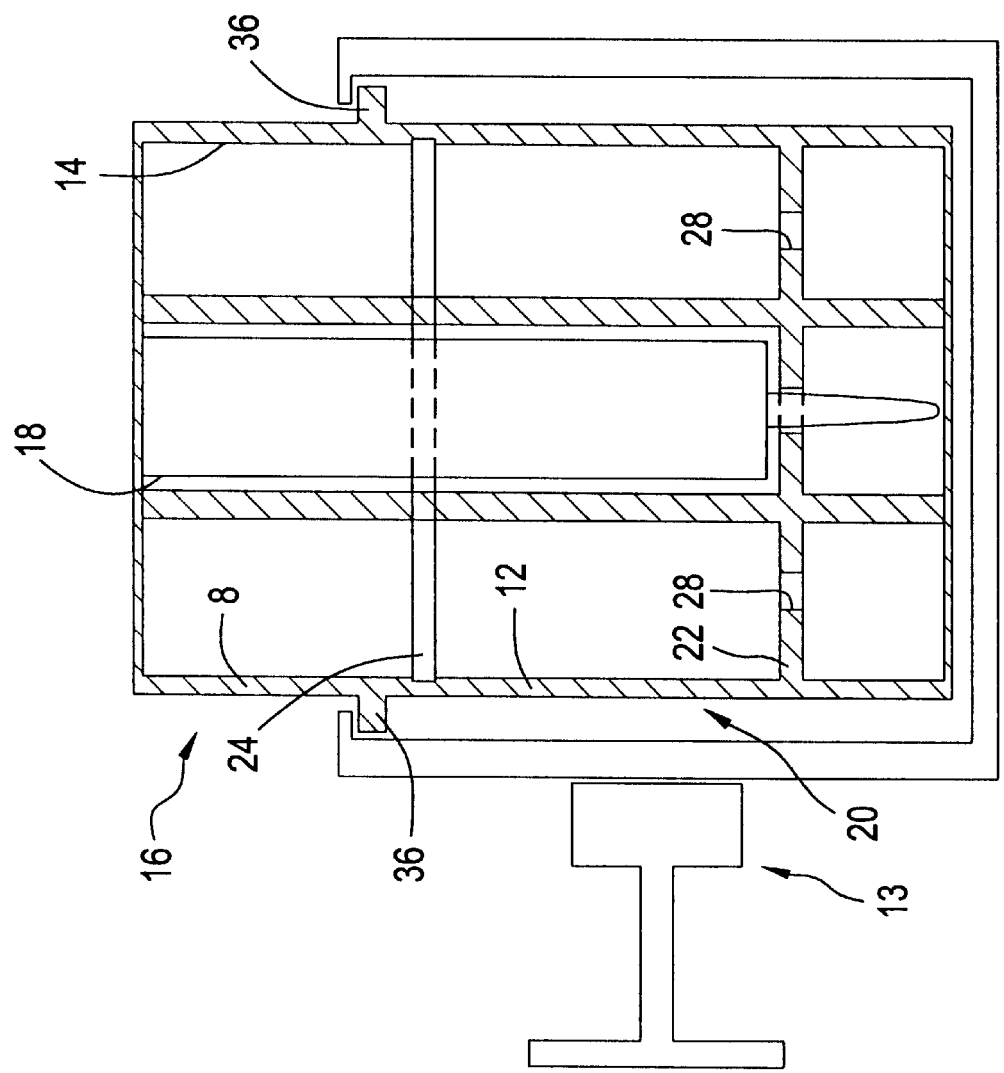

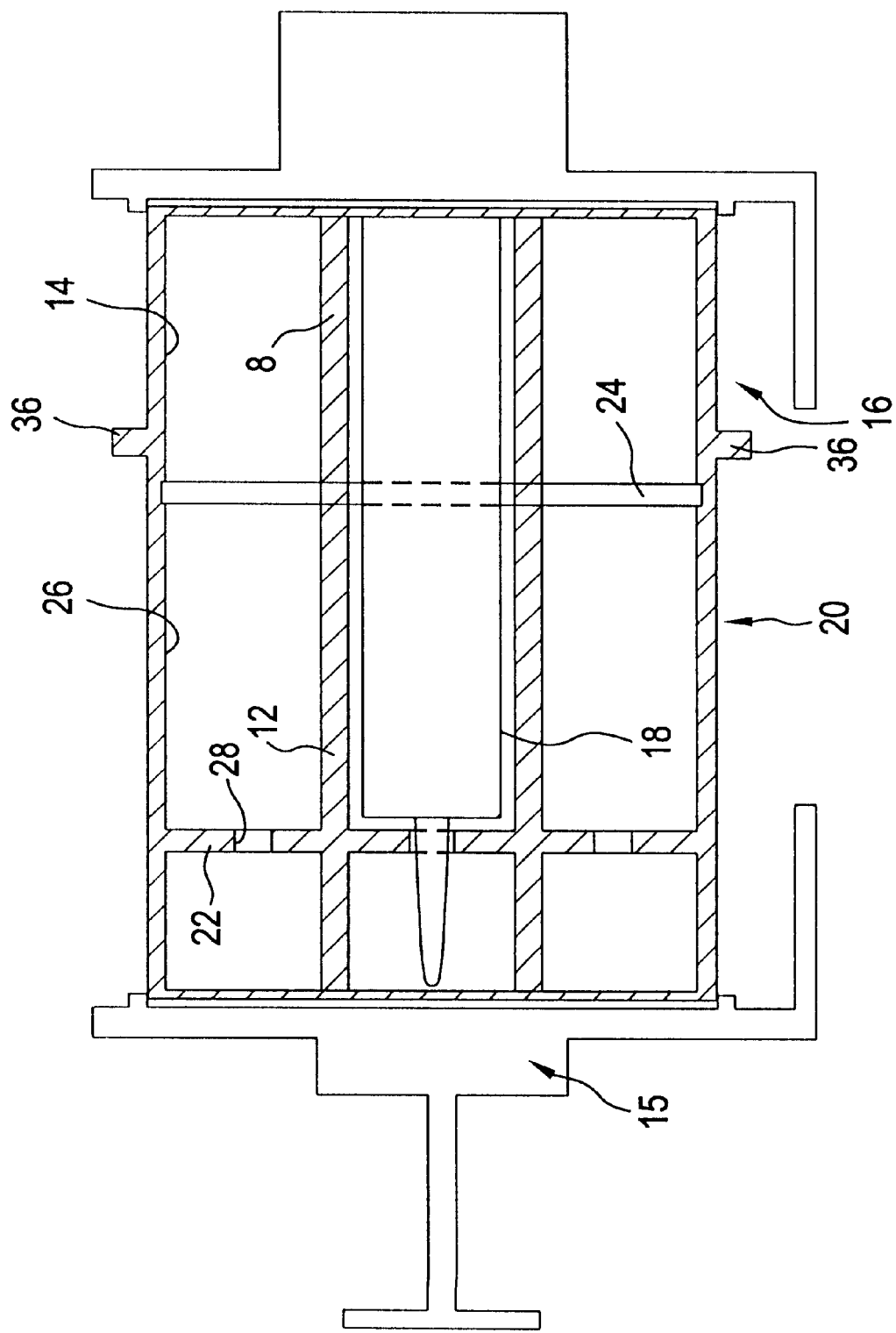

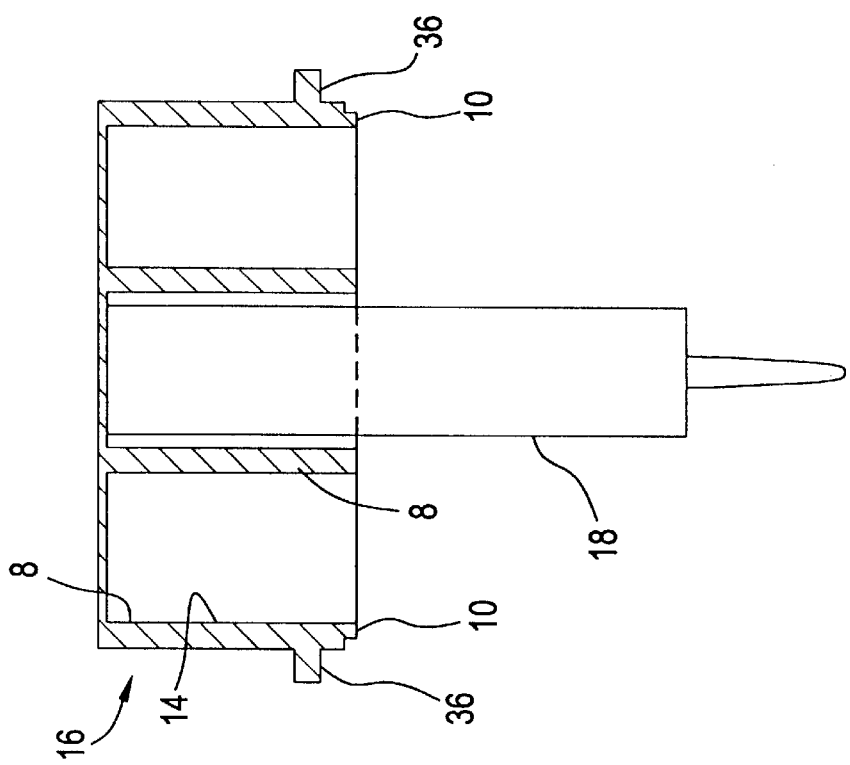
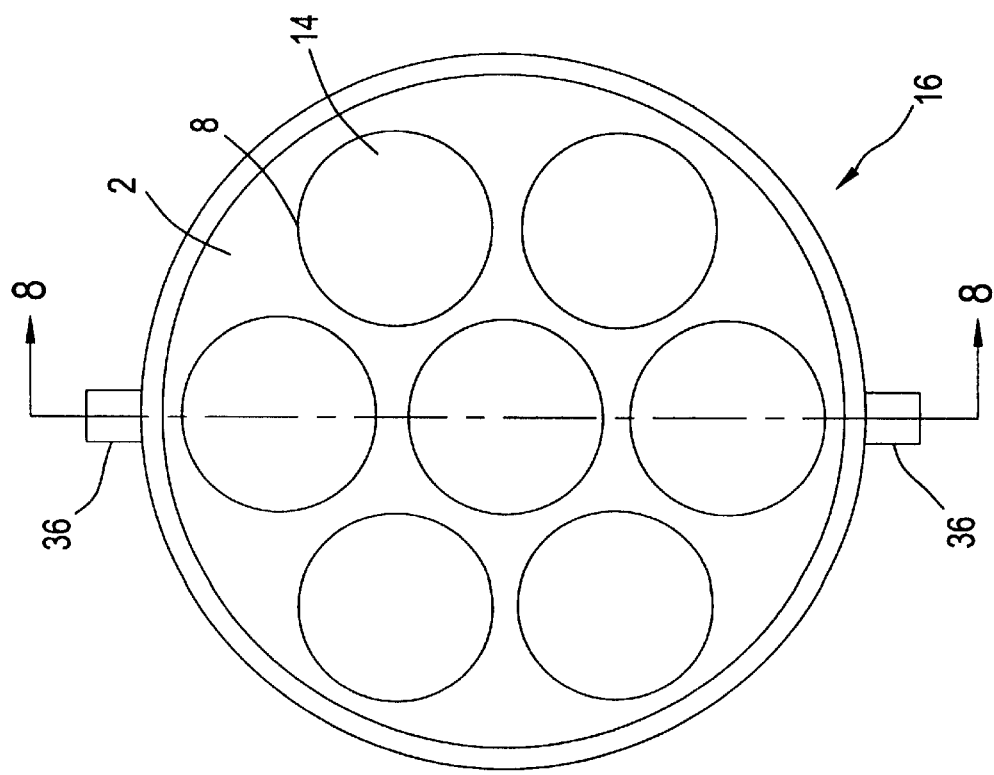

JIG SUITABLE FOR MOUNTING IN A PAINT SHAKER

RELATED APPLICATION

This application is a divisional of U.S. application Ser. No. 09/452,881 filed Dec. 2, 1999 which in turn claims priority to U.S. Provisional Application No. 60/111,156 filed Dec. 7, 1998 both of which is herein incorporated by reference.

BACKGROUND OF THE INVENTION

1. Field of the Invention

This invention relates to a method and composition for producing a colored caulk to match a predetermined paint color. The invention also relates to a jig suitable for mounting in a paint shaker.

2. Background of the Invention

Consumers may obtain paint to match a selected color from retail stores, including paint and hardware dealers. Many locations have color matching equipment that will reproduce a desired color from a mixture of available paints. Homeowners, painters, contractors, decorators, and the like have a need for colored caulks to match painted surfaces, as well as stained surfaces, wall papers, counter tops, bath and kitchen fixtures. Although colored caulks are known and sold in the industry, it is not commercially feasible to provide every desired color. Methods and apparatus for mixing pigments into caulk are known in the art.

U.S. Pat. No. 5,044,758, to Kurtz, describes a machine for mixing pigment into bulk caulk. The bulk caulk is shipped in a jar whose lid incorporates a stirring blade for mixing the pigment with the caulk. Kurtz points out that the stirring blade is necessary because the typical apparatus used to mix paints by shaking is unsuitable for mixing pigment with commercial caulk due to the high viscosity of the latter. After addition of pigment, a motor is attached to the jar through an engaging means to effect mixing of the contents. When mixing is complete, the caulk is forced out of the jar by means of a piston that collapses the jar and transfers the contents to standard caulk tubes. This method is cumbersome and requires expensive mixing equipment that is not normally used in locations where paint is mixed and sold. In addition to the expense of the mixing equipment, the apparatus of Kurtz requires a caulk container provided with a stirring blade attached to the lid, and separate tubes for the pigmented caulk, increasing the total container cost. There is no disclosure of the use of premixed paint as the coloring agent for the caulk.

A method and composition for producing a colored caulk to match a predetermined color using only standard equipment used by paint retailers, and a single container would be desirable.

SUMMARY OF THE INVENTION

This invention is directed to a method for producing a colored adhesive caulking material by the steps of: (a) providing in a resealable container a caulk forming composition which can be thickened by contact with a pigmented composition; (b) adding a pigmented composition of a predetermined color to the caulk forming composition in the resealable container; and (c) shaking the resealable container, thereby thickening the caulk forming composition to form a colored adhesive caulking material. Preferably, the resealable container is shaken on a vibratory mixer.

The invention is also directed to a caulk forming composition comprising an aqueous polymeric resin, a plasticizer, a surface modifying agent, a filler and a pH modifier; and to an adhesive colored caulking material produced by the method of this invention.

This invention is further directed to a modified paint shaker jig useful in the method of this invention. The jig is capable of holding tubular containers and being mounted in a paint shaker.

BRIEF DESCRIPTION OF THE DRAWINGS

FIG. 5 is a side cross-sectional view showing a modified paint shaker jig positioned in a top-mounted paint shaker.

FIG. 6 is a side cross-sectional view showing the modified paint shaker jig positioned in a side-mounted paint shaker.

FIGS. 7 and 8 are bottom and cross-sectional views, respectively, of the top section of the modified paint shaker jig.

DETAILED DESCRIPTION OF THE INVENTION

In the method of the present invention, a resealable container is partially filled with a caulk forming composition of low viscosity relative to a typical caulking material. The viscosity of the caulk forming composition is typically in the range from about 0.6–0.8 million centipoise. The container is sealed, preferably with a plunger fitted with a removable handle which allows the container to be opened and resealed at a wholesale or retail outlet. After the container is opened, a pigmented composition, preferably a water-based paint that has been premixed to match a predetermined color of the customer's choice, is added to the container, and the container is resealed, preferably by re-inserting the plunger and removing the handle. The container is then secured to a vibratory mixer, e.g., a standard or modified paint shaker, and shaken to mix the paint and the caulk forming composition. As the mixing is accomplished, the contents of the container thicken to form a colored adhesive caulking material. The container is then ready for use by the consumer in standard caulking equipment, e.g., a caulking gun.

The resealable container employed in the present invention is any container which may be opened to add the pigmented composition and then resealed for mixing. The container must be resistant to the vibrations encountered during mixing. Suitable containers include without limitation paint cans with resealable lids, and standard caulk tubes with plungers. Preferably, the container is a standard caulk tube.

In a preferred embodiment of the invention, a removable handle is attached to the plunger. A variety of means for attaching such a removable handle will be apparent to those skilled in the art. Examples of the means of attachment include, without limitation: (1) manufacture of the plunger and handle as a single piece of material which can be broken near the plunger section by twisting, thereby removing the handle from the plunger; (2) threading the handle into a socket on the plunger; and (3) utilizing a "twist-and-lock" mechanism to allow easy attachment and removal of the handle.

Figure 1:
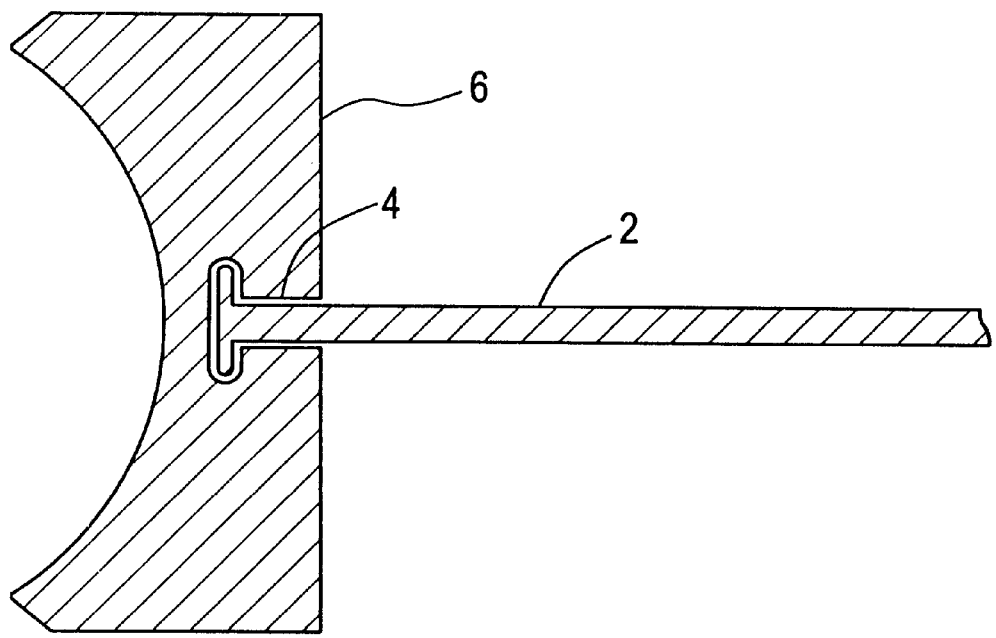
FIGS. 1 and 2 are side cross-sectional and bottom views, respectively, showing the construction of a plunger with a removable "T" handle and a twist and lock attachment.
Figure 2:
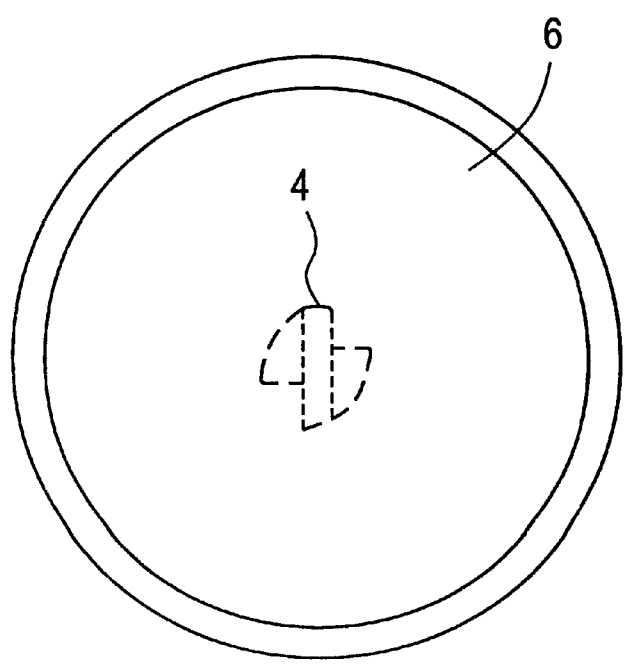

FIG. 1 illustrates a preferred embodiment of the invention in which a plunger with a removable "T" handle and twist and lock system of attachment is employed. The narrow end of handle 2 engages with socket 4 on plunger 6. Handle 2 is twisted to lock it into plunger 6. This construction allows easy removal of the plunger using the "T" handle when the paint is to be added. In FIG. 2, the cross-sectional view of FIG. 1, shows the handle in the locked position; the handle would be rotated 90° to the unlocked position. The plunger may then easily be replaced, sealing the paint and caulk forming composition into the container, and the handle removed from the plunger by twisting the handle to disengage the handle from the plunger, and then sliding the handle out of the plunger. The bottom view of FIG. 2 shows the plunger without the handle.

Figure 3:
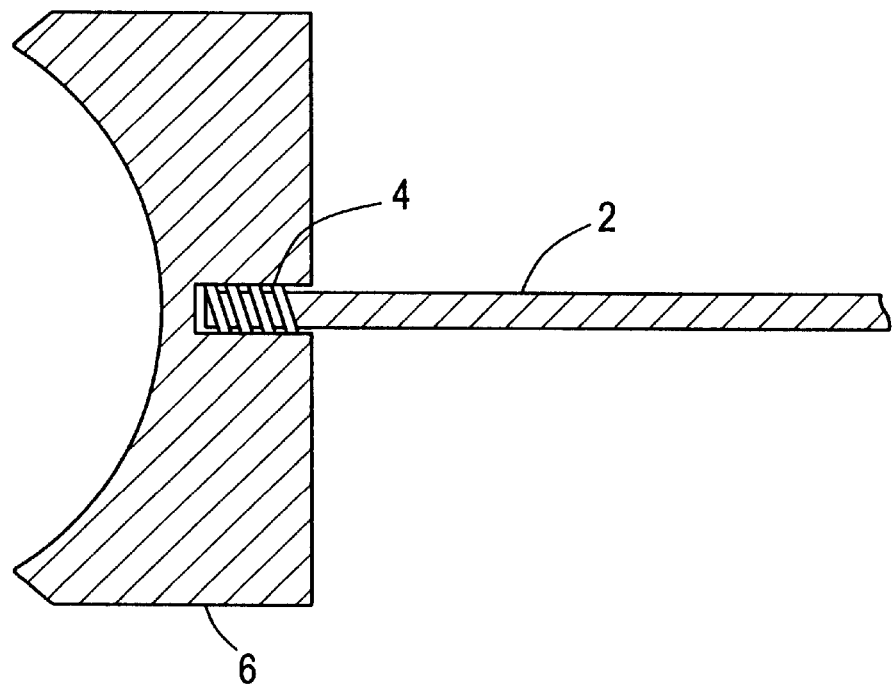
FIGS. 3 and 4 are side cross-sectional and bottom views, respectively, showing the construction of a plunger with a removable "T" handle and a threaded attachment system.
Figure 4:
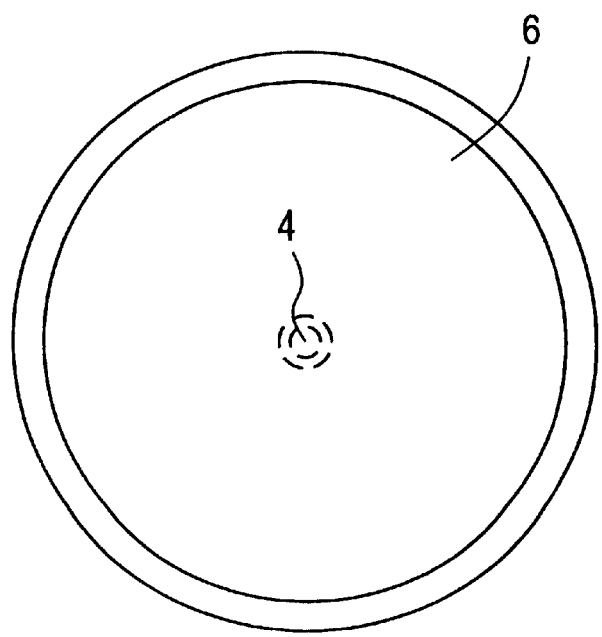

FIG. 3 illustrates the construction of a plunger with a removable threaded "T" handle. Threads on the narrow end of handle 2 engage a threaded socket 4 on plunger 6. This construction allows easy removal of the plunger using the "T" handle when the paint is to be added. The plunger may then easily be replaced, sealing the paint and caulk forming composition into the container, and the handle removed from the plunger by rotating the handle to disengage the threaded end of the handle from the threaded socket on the plunger. The bottom view of FIG. 4 shows the plunger without the handle.

This invention also includes a modified paint shaker jig designed to accommodate resealable tubes in which the colored adhesive caulking material of this invention is produced. The jig is of a size and shape suitable for mounting in a paint shaker, and comprises a first section and a second section. Each section is constructed as a single piece by molding, casting, or drilling out a solid piece; or alternatively, by assembling sheets of material, e.g., metal or plastic. The first section comprises a substantially cylindrical frame having a first outer surface and a first inner surface; wherein the first inner surface has a plurality of first openings for holding tubular containers, e.g., standard caulk tubes. The first outer surface, the first inner surface, and the first openings are substantially circular. The second section comprises a substantially cylindrical frame having a second outer surface and a second inner surface; wherein the second inner surface has a plurality of second openings for holding tubular containers. The second outer surface, the second inner surface, and the second openings are substantially circular. The first section and the second section fit together to form a substantially cylindrical jig capable of holding a plurality of tubular containers.

In a preferred embodiment of this invention, the first openings are of substantially equal size, and the second openings are of substantially equal size. It is further preferred that each of the second openings has a diameter substantially equal to that of each of the first openings, and that the outside diameters of the first and second sections are substantially equal. In the same preferred embodiment, the jig has an outside diameter from about 6½ inches to about 6⅝ inches. Most preferably, the jig has an outside diameter approximating that of a standard one-gallon paint can, i.e., about 6 and 9/16 inches; the first openings have a diameter that will accommodate a standard caulk tube, i.e., from about 1.875 inches to about 1.925 inches; and the second openings also have a diameter from about 1.875 inches to about 1.925 inches. It is further preferred that there is a substantially circular interior surface below the second surface, and that the interior surface has substantially circular openings of substantially equal size that will accommodate the nozzle of a standard caulk tube, i.e., from about 0.625 inches to about 0.65 inches. Preferably at least one of the jig sections bears at least one brace on the outside curved surface to facilitate mounting the jig in a top-loading paint shaker.

A preferred embodiment of the modified paint shaker jig, in which the jig has been molded or cast as a single piece, is shown in FIG. 5 mounted in a top-mounted paint shaker 13. FIG. 6 shows the same jig as mounted in a side-mounted paint shaker 15. In this preferred embodiment, each section of the jig is constructed as a single molded or cast piece. The top section 16 of the modified paint shaker jig is shown in FIGS. 7A and 8. In the bottom view, FIG. 7, the inner surface 2 has several circular first openings 14. A brace 36 facilitates mounting in a top-loading paint shaker is attached to each side of the top section. The cross-sectional view in FIG. 8 shows the sleeves 8 extending from the openings 14 to support caulk tubes. A circular flange 10 extends from surface 2. The top section is shown in FIG. 8 with one caulk tube 18 in place.

Figure 10:
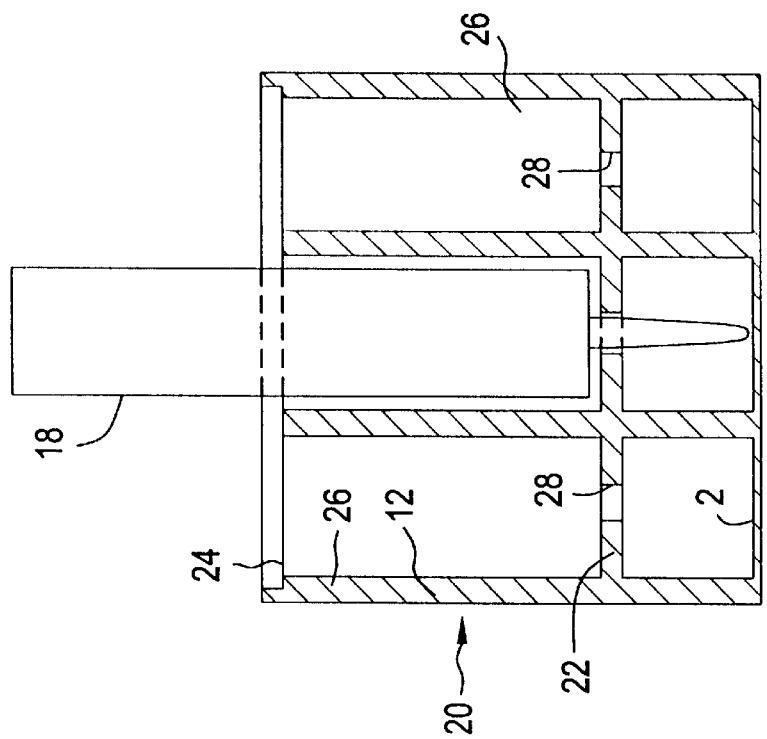
FIGS. 9 and 10 are bottom and cross-sectional views, respectively, of the bottom section of the modified paint shaker jig.
Figure 9:
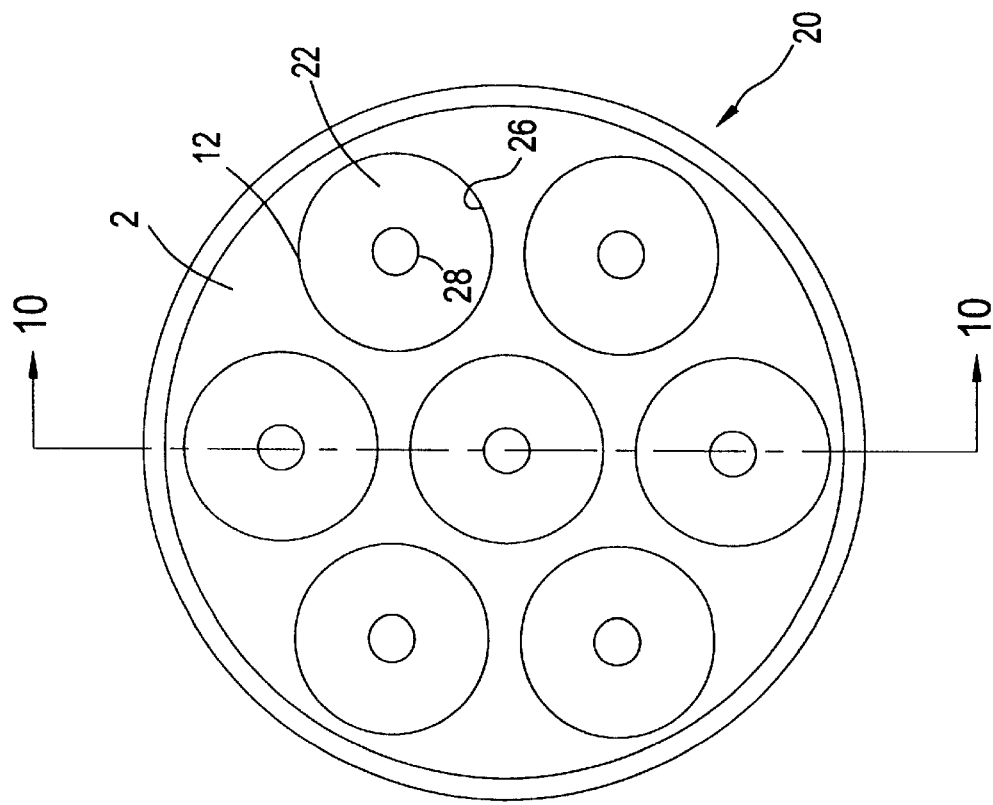

FIG. 9 is a top view of the bottom section 20 of the modified paint shaker jig. The inner surface 2 has several circular second openings 26. An additional surface 22 below inner surface 2 has several circular third openings 28 which are smaller than openings 26. The third openings receive nozzle portions of the caulk tube containers. The cross-sectional view in FIG. 10 shows sleeves 12 extending through both surfaces, 2 and 22. Surface 24 provides seating for the flange 10 on the top section 16 when the two sections are joined to form the complete paint shaker jig.

The caulk forming composition employed in this invention is of lower viscosity than a conventional adhesive caulking material. This lower viscosity allows the caulk forming composition to be mixed with the pigmented composition by shaking. Conventional adhesive caulking material has a much higher viscosity and high-shear mixing is required to blend the caulk with a pigmented material. Typically, the caulk forming composition is an aqueous mixture comprising a polymeric resin, a plasticizer, a surface-active agent, a filler, and a pH modifier. Optionally, the caulk forming composition also contains one or more of a biocide, a thickening agent, and a glycol solvent.

Suitable polymeric resins include without limitation acrylic polymers, styrene-acrylic polymers, ethylene-vinyl acetate polymers, styrene-butadiene polymers, urethane polymers and vinyl acetate polymers. Resins based on acrylic polymers are preferred. The most preferred acrylic resin is Rhoplex 1785 (available from Rohm & Haas, Philadelphia, Pa.). Suitable plasticizers include without limitation phthalate esters, dibenzoate esters and polymeric plasticizers. Preferred plasticizers include butylbenzylphthalates; dibenzoate plasticizers K-Flex DP, Benzoflex 9–88 and Benzoflex 50; and polymeric plasticizer Rohm & Haas WP-1. Commercial plasticizers are available from Kalama Chemical, Garfield, N.J. Suitable surface modifying agents include without limitation sodium lauryl sulfate, sodium salts of carboxylic acids, petroleum-based defoamers, potassium tripolyphosphate and octylphenoxypolyethoxyethanol. Preferred surface-active agents include Foamaster 111 (available from Henkel Corp., Ambler, Pa.), Foamkill 639 J-OH (available from Crucible Chemical Corp., Greenville, S.C.), Tamol 850 (available from Rohm & Haas, Philadelphia, Pa.) and potassium tripolyphosphate. The preferred type of filler is a fumed silica; Sipemat 22LS (available from North America Silica Corp., Valley Forge, Pa.) is especially preferred. Suitable pH modifiers are water-soluble basic compounds. The preferred pH modifiers are aqueous ammonia, triethanolamine and morpholine. Suitable biocides include without limitation tributyltin salicylate, metal compounds having biocidal activity, and isothiazolinones. Preferred biocides include Troysan Polyphase P-20-T, Kathon LX and Skane M-8. Biocides are available from Troy Chemical, Newark, N.J. Suitable thickening agents include any substances capable of adjusting the pH of the composition to within the range from about 7 to about 9, preferably between about 7.9 and about 8.5. Preferred thickening agents are ammonium hydroxide and triethanolamine. The most preferred thickening agent is ammonium hydroxide. Preferred glycol solvents include propylene glycol, ethylene glycol and butylene glycol.

The pigmented composition employed in this invention is any composition that will cause the caulk forming composition to thicken to the desired viscosity and impart the desired color to the colored adhesive caulking material. It is preferred that the pigmented composition is a water-based paint which is selected from commercially available paints or blended from at least two commercially available paints to match a predetermined color.

The following examples are presented in order to illustrate various aspects of the present invention, but are not intended to limit it.

EXAMPLES

Example 1

Preparation of Caulk Forming Composition

The following ingredients are mixed to produce the caulk forming composition:

| | | |
|---|---|---|
| Rhoplex 1785 Resin | | 410 g |
| Gloucester Intermediate INT-07 | | 26 g |
| (Weight % Composition of INT-07: | | |
| Triton X-405 | 37.48 | |
| Propylene Glycol | 47.54 | |
| KathonLXl.5 | 7.38 | |
| SkaneM-8 | 7.60) | |
| K-Flex | | 12.5 g |
| Water | | 9.9 g |
| Tamol 850 | | 23.6 g |
| Potassium Tripolyphosphate | | 0.94 g |
| Foamaster 111 | | 1.3 g |
| Sipernat 22LS | | 9.4 g |
| 1:1, Water:Ammonium Hydroxide | | 15.0 g |

The ingredients are preferably added to the mixture in the order listed above.

Example 2

Production of Colored Adhesive Caulking Material

A caulking cartridge containing 265 g of the mixture produced in Example 1 is inserted nozzle down into the bottom of a modified paint shaker jig. A removable plunger with a detachable "T" handle is removed from the cartridge. Water-based paint (105 g) is added to the caulking cartridge. The cartridge is slightly squeezed by hand, the plunger is reinserted into the cartridge, and hand pressure is released to aid in seating of the plunger. The cartridge is secured in the paint shaker jig by placing the top assembly flange into the bottom flange mate. The jig is then secured to the paint shaker machine. The caulking cartridge is shaken on the paint shaker jig for at least 10 minutes. The resulting colored adhesive caulking material is not used for at least 30 minutes.

The preceding Examples are intended to describe certain preferred embodiments of the present invention. It should be appreciated, however, that obvious additions and modifications of the invention will be apparent to one skilled in the art. The invention is not limited except as set forth in the claims.

What is claimed is:

1. A jig suitable for mounting in a paint shaker, said jig comprising a first section and a second section, wherein said first section comprises a substantially cylindrical frame having a first outer surface and a first inner surface, wherein said first inner surface has a plurality of first openings for holding tubular containers;

said second section comprises a substantially cylindrical frame having a second outer surface and a second inner surface, wherein said second inner surface has a plurality of second openings for holding tubular containers;

wherein said first outer surface, said first inner surface, said first openings, said second outer surface, said second inner surface, and said second openings are substantially circular;

wherein said first openings have substantially equal diameters to said second openings to accommodate substantially cylindrical tubular containers; and wherein said first section and said second section fit together in direct, seating contact, such that when the jig is assembled the distance between the first openings and the second openings is the same whether or not the tubular containers are in place, to form a substantially cylindrical jig capable of holding a plurality of substantially cylindrical tubular containers.

2. The jig of claim 1 in which each of said first openings has a diameter from about 1.875 inches to about 1.925 inches.

3. The jig of claim 1 in which each of said second openings has a diameter from about 1.875 inches to about 1.925 inches.

4. The jig of claim 1 wherein said first section has a brace for facilitating mounting of said jig in the paint shaker.

5. A jig suitable for mounting in a paint shaker, said jig comprising a first section and a second section, wherein said first section comprises a substantially cylindrical frame having a first outer surface and a first inner surface, wherein said first inner surface has a plurality of first openings for holding tubular containers;

said second section comprises a substantially cylindrical frame having a second outer surface and a second inner surface, wherein said second inner surface has a plurality of second openings for holding tubular containers;

wherein said first outer surface, said first inner surface, said first openings, said second outer surface, said second inner surface, and said second openings are substantially circular;

wherein said first openings have substantially equal diameters to said second openings to accommodate substantially cylindrical tubular containers; and wherein said first section and said second section fit together, such that when the jig is assembled the distance between the first openings and the second openings is the same whether or not the tubular containers are contained therein, to form a substantially cylindrical jig capable of holding a plurality of tubular containers, in which each of said first section and said second section has an outside diameter of from about 6½ inches to about 6⅝ inches.

6. A jig suitable for mounting in a paint shaker, said jig comprising a first section and a second section, wherein said first section comprises a substantially cylindrical frame having a first outer surface and a first inner surface, wherein said first inner surface has a plurality of first openings for holding tubular containers;

said second section comprises a substantially cylindrical frame having a second outer surface and a second inner surface, wherein said second inner surface has a plurality of second openings for holding tubular containers;

wherein said first outer surface, said first inner surface, said first openings, said second outer surface, said second inner surface, and said second openings are substantially circular;

wherein said first section and said second section fit together in direct, seating contact to form a substantially cylindrical jig capable of holding a plurality of tubular containers;

wherein each of said first section and said section has an outside diameter of from about 6½ inches to about 6⅝ inches; and wherein the jig further comprises a substantially circular interior surface below said second inner surface, said interior surface having substantially circular third openings of substantially equal diameter.

7. The jig of claim 6 in which each of said third openings has a diameter from about 0.625 inches to about 0.65 inches.

8. The jig of claim 7 which further comprises at least one brace on one of said first section or said second section to allow mounting in a top-loading paint shaker.

9. A jig suitable for mounting in a paint shaker, said jig comprising a first section and a second section, wherein said first section comprises a substantially cylindrical frame having a first outer surface and a first inner surface, wherein said first inner surface has a plurality of first openings for holding tubular containers;

said second section comprises a substantially cylindrical frame having a second outer surface and a second inner surface, wherein said second inner surface has a plurality of second openings for holding tubular containers;

wherein said first outer surface, said first inner surface, said first openings, said second outer surface, said second inner surface, and said second openings are substantially circular and equal sized;

wherein said first section and said second section fit together in direct, seating contact to form a substantially cylindrical jig capable of holding a plurality of tubular containers, and wherein said second section has a plurality of third openings for receiving nozzle portions of said tubular containers.

10. A jig suitable for mounting in a paint shaker, said jig comprising a first section and a second section, wherein said first section comprises a substantially cylindrical frame having a first outer surface and a first inner surface, wherein said first inner surface has a plurality of first openings for holding tubular containers;

said second section comprises a substantially cylindrical frame having a second outer surface and a second inner surface, wherein said second inner surface has a plurality of second openings for holding tubular containers;

wherein said first outer surface, said first inner surface, said first openings, said second outer surface, said second inner surface, and said second openings are substantially circular;

wherein said first section and said second section fit together in direct, seating contact to form a substantially cylindrical jig capable of holding a plurality of tubular containers;

wherein said second section has a plurality of third openings for receiving nozzle portions of said tubular containers; and wherein said third openings are substantially circular.

\* \* \* \* \*